United States Patent
Inui et al.

(10) Patent No.: US 11,761,752 B2
(45) Date of Patent: Sep. 19, 2023

(54) DEVICE AND METHOD FOR MEASURING OXIDE FILM THICKNESS

(71) Applicant: KOBE STEEL, LTD., Kobe (JP)

(72) Inventors: Masahiro Inui, Kobe (JP); Hiroyuki Takamatsu, Kobe (JP); Ryota Nakanishi, Kakogawa (JP)

(73) Assignee: KOBE STEEL, LTD., Kobe (JP)

( * ) Notice: Subject to any disclaimer, the term of this patent is extended or adjusted under 35 U.S.C. 154(b) by 360 days.

(21) Appl. No.: 17/281,131

(22) PCT Filed: Oct. 7, 2019

(86) PCT No.: PCT/JP2019/039540
§ 371 (c)(1),
(2) Date: Mar. 29, 2021

(87) PCT Pub. No.: WO2020/095599
PCT Pub. Date: May 14, 2020

(65) Prior Publication Data
US 2021/0356254 A1    Nov. 18, 2021

(30) Foreign Application Priority Data

Nov. 9, 2018    (JP) ................................ 2018-211333

(51) Int. Cl.
*G01B 11/06*    (2006.01)
*C23C 2/04*    (2006.01)

(52) U.S. Cl.
CPC ............ *G01B 11/0658* (2013.01); *C23C 2/04* (2013.01)

(58) Field of Classification Search
CPC . G01B 11/0625; G01B 11/06; G01B 11/0658; G01B 11/0633; G01B 11/0691;
(Continued)

(56) References Cited

U.S. PATENT DOCUMENTS

2018/0274904 A1 *   9/2018   Miura .................... G01B 15/02

FOREIGN PATENT DOCUMENTS

DE    102007062052 A1 *   6/2009   ........... G01B 11/065
EP         0768512 A2 *   4/1997
(Continued)

OTHER PUBLICATIONS

International Search Report dated Nov. 5, 2019 in PCT/JP2019/039540 filed on Oct. 7, 2019, 2 pages.

*Primary Examiner* — Michael P Stafira
(74) *Attorney, Agent, or Firm* — Oblon, McClelland, Maier & Neustadt, L.L.P.

(57) ABSTRACT

An oxide layer thickness measurement device according to the present invention stores, for each of layer thickness measurement sub-ranges constituting a layer thickness measurement range, layer thickness conversion information representing a correlation between a layer thickness and an emitting light luminance where a ratio of a change in the emitting light luminance to a change in the layer thickness in the layer thickness measurement sub-range falls within a set extent. The device includes a plurality of emitting light luminance measurement parts for measuring emitting light luminances of a surface of a steel sheet at respective measurement wavelengths different from each other. Calculated in connection with each of the emitting light luminances of the surface of the steel sheet measured by the emitting light luminance measurement parts are the layer thickness corresponding to the measured emitting light luminance and a ratio at the layer thickness by using the layer thickness conversion information corresponding to each of the emitting light luminance measurement parts. The calculated layer thickness is extracted as a candidate value for an actual thickness layer when the calculated ratio is
(Continued)

within the set extent assigned for the layer thickness conversion information.

2 Claims, 6 Drawing Sheets

(58) Field of Classification Search
CPC .............. G01B 11/0675; G01B 21/085; G01B 9/0209; G01B 2210/56; G01B 9/02025; G01B 9/02088; G01B 21/042; G01B 11/065; G01B 9/02; G01B 9/02091; G01B 11/00; G01B 11/02; G01B 9/02057; G01B 9/02083; G01B 9/02084; G01B 11/0616; G01B 11/105; G01B 11/303; G01B 2290/70; C23C 2/06; C23C 2/00; C23C 2/02; C23C 2/04
See application file for complete search history.

(56) References Cited

FOREIGN PATENT DOCUMENTS

| | | | | | |
|---|---|---|---|---|---|
| EP | 1653192 | A1 | * | 5/2006 | ......... G01B 11/0625 |
| FR | 3007831 | A1 | * | 1/2015 | ............... C23C 2/06 |
| JP | 3-293504 | A | | 12/1991 | |
| JP | 2009186333 | A | * | 8/2009 | ......... G01B 11/0633 |
| JP | 2011202968 | A | * | 10/2011 | |
| KR | 930014760 | A | * | 7/1993 | |
| WO | WO-2013088871 | A1 | * | 6/2013 | ......... G01B 11/0625 |
| WO | WO-2016147782 | A1 | * | 9/2016 | ............ G01B 11/06 |

* cited by examiner

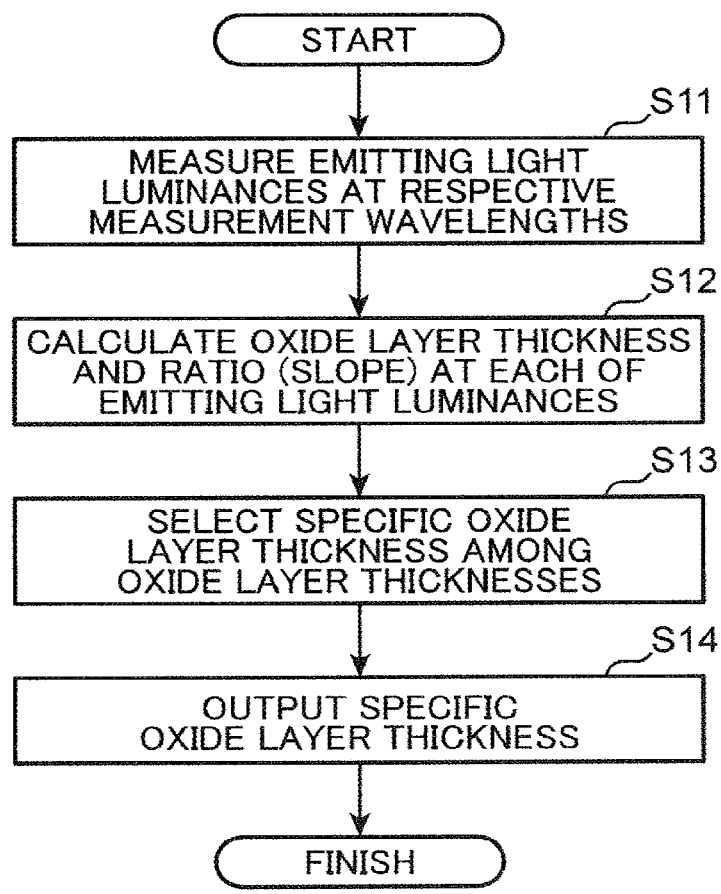

DEVICE AND METHOD FOR MEASURING OXIDE FILM THICKNESS

TECHNICAL FIELD

The present invention relates to an oxide layer thickness measurement device and an oxide layer thickness measurement method for measuring a thickness of an oxide layer which comes into existence on a surface of a steel sheet.

BACKGROUND ART

A hot-dip galvanized steel sheet has various characteristics such as an excellent corrosion resistance, an excellent workability, and good surface appearance, and thus is preferably applicable to a steel sheet for a vehicle. It has been known in the hot-dip galvanization that an oxide layer which comes into existence on a surface of a steel sheet in an annealing step has a negative influence on galvanization characteristics of a galvanized layer formed in a hot-dip galvanization step. To avoid the negative influence, it is necessary to measure a thickness of the oxide layer, and desirably reduce the oxide layer in a reduction step. Additionally, it is important to further measure the thickness of the oxide layer.

A technology of measuring a thickness of an oxide layer includes obtaining a relation between an emissivity (emitting light luminance) of a surface of a steel sheet and a thickness of the oxide layer in advance, and calculating the thickness of the oxide layer corresponding to the emissivity (emitting light luminance) obtained in a measurement using the relation (see Patent Literature 1).

Meanwhile, the relation between the emissivity (emitting light luminance) of the surface of the steel sheet and the thickness of the oxide layer typically has a profile that the emissivity (emitting light luminance) of the surface of the steel sheet monotonically increases until a peak in accordance with an increase in the thickness of the oxide layer, and thereafter decreases or repetitively increases and decreases. Hence, use of this relation for the calculation of the thickness of the oxide layer corresponding to the emissivity (emitting light luminance) obtained in the measurement may lead to a failure in determination of the thickness of the oxide layer at a single value. For this reason, the calculation of the thickness of the oxide layer with the use of the relation has a restriction that the layer thickness is unmeasurable after the emissivity reaches the peak. Under this restriction, the thickness of the oxide layer is calculated within a range of a ratio of one to one between the emissivity (emitting light luminance) of the surface of the steel sheet and the thickness of the oxide layer. In this case, when the ratio (slope) of a change in the emissivity (emitting light luminance) to a change in the thickness of the oxide layer is small, the thickness of the oxide layer significantly changes even by a slight difference in the emissivity (emitting light luminance) obtained in the measurement. This results in difficulty in accurately calculating the thickness of the oxide layer.

CITATION LIST

Patent Literature

Patent Literature 1: Japanese Unexamined Patent Publication No. HEI 3-293504

SUMMARY OF INVENTION

The present invention has been accomplished in view of the aforementioned drawbacks, and an object of the present invention is to provide an oxide layer thickness measurement device and an oxide layer thickness measurement method for achieving a more accurate measurement of a thickness of an oxide layer in a wider range.

In an oxide layer thickness measurement device and an oxide layer thickness measurement method according to the present invention, prepared for each of layer thickness measurement sub-ranges constituting a layer thickness measurement range is layer thickness conversion information representing a correlation between a layer thickness and an emitting light luminance where a ratio of a change in the emitting light luminance to a change in the layer thickness in the layer thickness measurement sub-range falls within a preset extent. Further, a plurality of emitting light luminance measurement parts measure emitting light luminances of a surface of a steel sheet at respective measurement wavelengths different from each other.

Calculated in connection with each of the emitting light luminances of the surface of the steel sheet measured by the emitting light luminance measurement parts are the layer thickness corresponding to the emitting light luminance measured by the corresponding emitting light luminance part and a ratio at the layer thickness by using the layer thickness conversion information corresponding to the emitting light luminance measurement part. The calculated thickness is extracted as a candidate value for an actual layer thickness when the calculated ratio is within the preset extent assigned for the layer thickness conversion information.

The object, features, and advantages of the present invention will be further clarified by the following detailed description and the accompanying drawings.

BRIEF DESCRIPTION OF DRAWINGS

FIG. 6 is a flowchart showing an operation of the oxide layer thickness measurement device.

DESCRIPTION OF EMBODIMENTS

Figure 1:
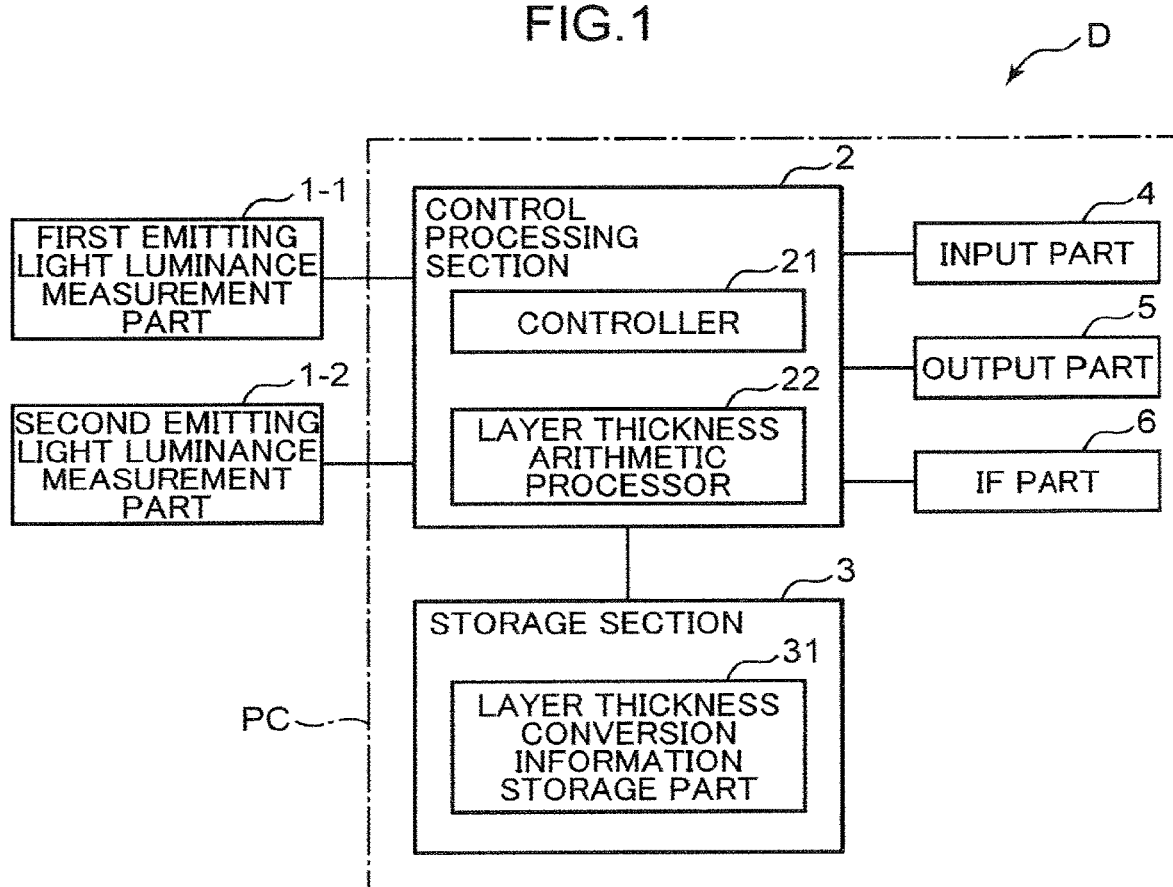
FIG. 1 is a block diagram showing a configuration of an oxide layer thickness measurement device according to an embodiment.

Hereinafter, one or more embodiments of the present invention will be described with reference to the accompanying drawings. However, the scope of the invention should not be limited to the disclosed embodiments. Elements denoted by the same reference numerals in the drawings have the same configuration and, therefore, repeated descriptions will be appropriately omitted. In the present specification, elements are denoted by a same reference numeral when being referred to collectively, and are denoted by a same reference numeral accompanied by a different respective reference character when being referred to individually.

Figure 2:
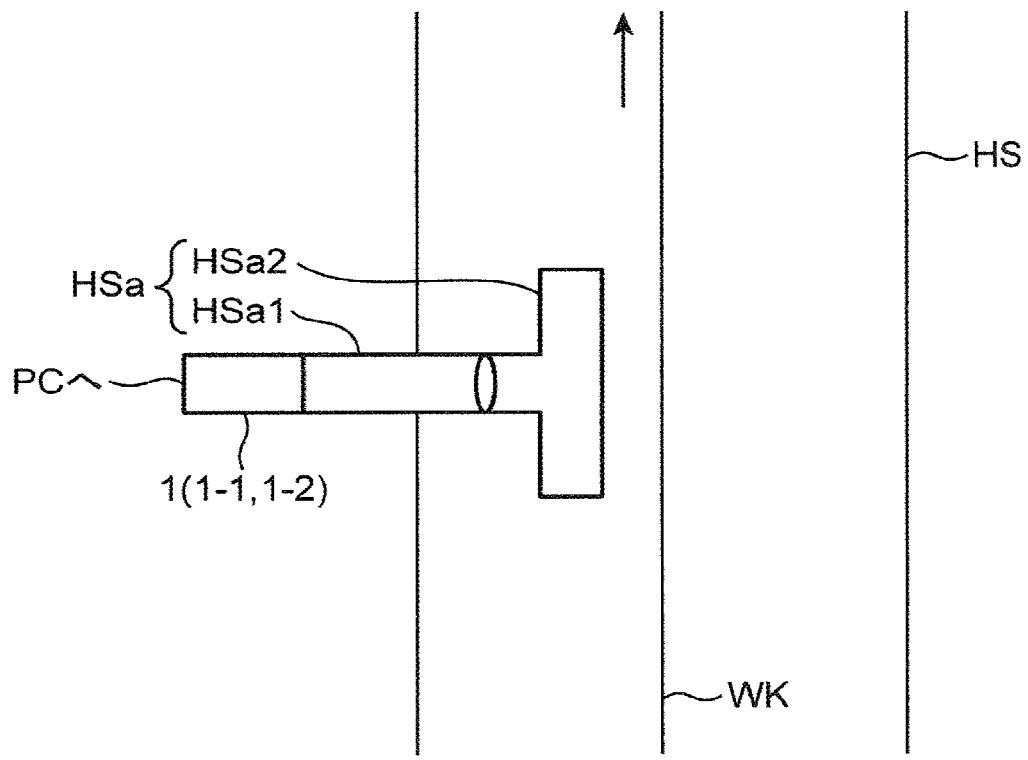
FIG. 2 is a cross-sectional view explaining an arrangement state of first and second emitting light luminance measurement parts attached to a conveyance passage for a steel sheet in the oxide layer thickness measurement device.
Figure 3:
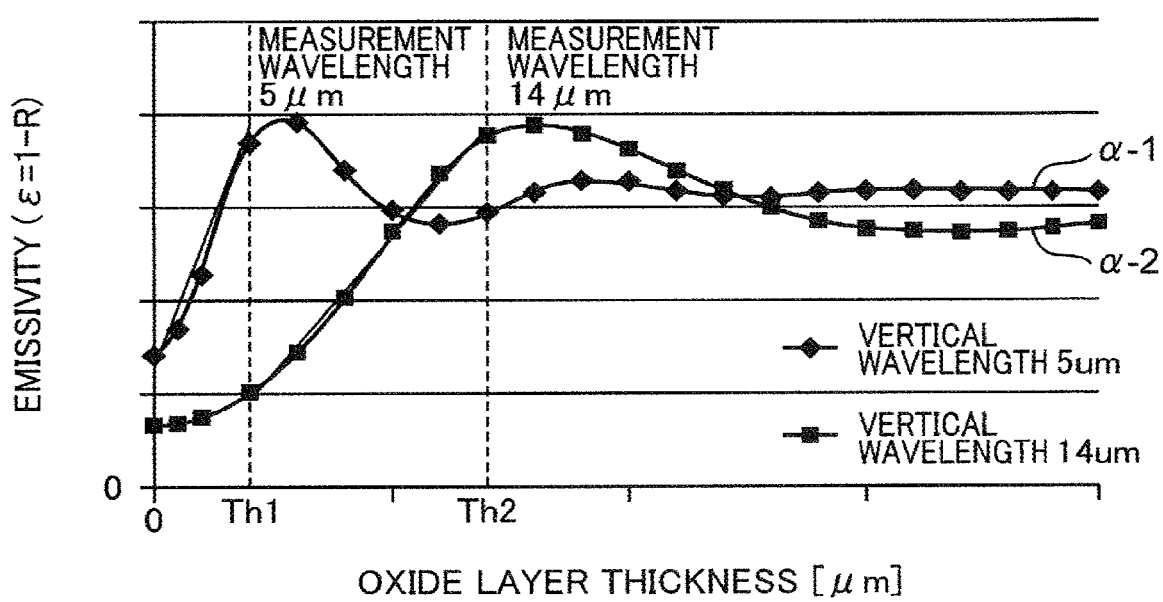
FIG. 3 is a graph for explaining a plurality of sets of layer thickness conversion information stored in the oxide layer thickness measurement device.
Figure 4A:
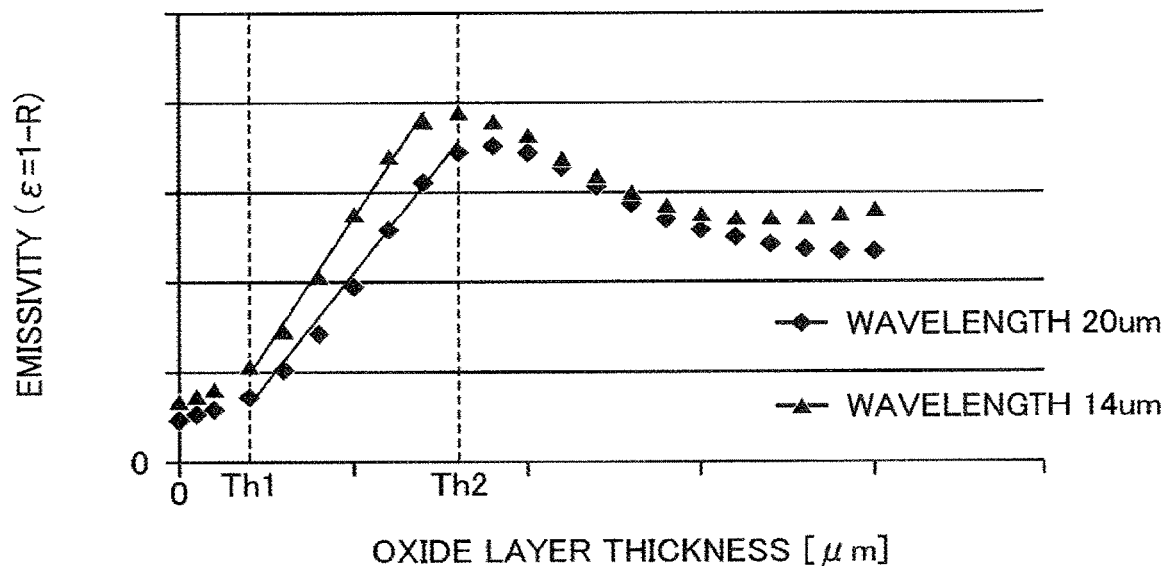
FIG. 4 includes graphs each showing a correlation between a thickness of an oxide layer and an emissivity (emitting light luminance) at different measurement wavelengths.
Figure 4B:
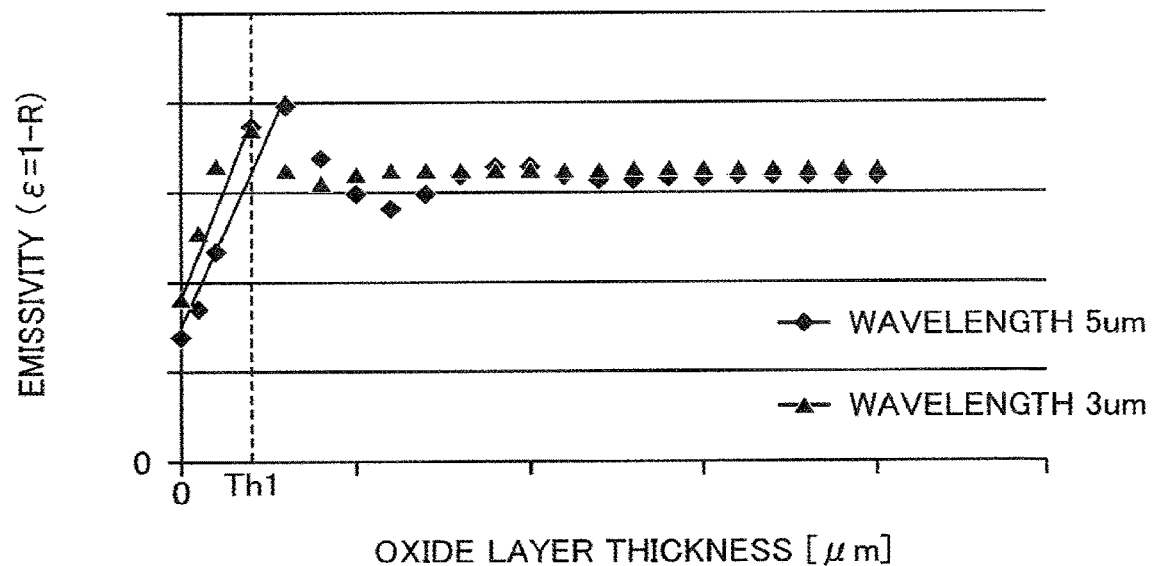
Figure 5:
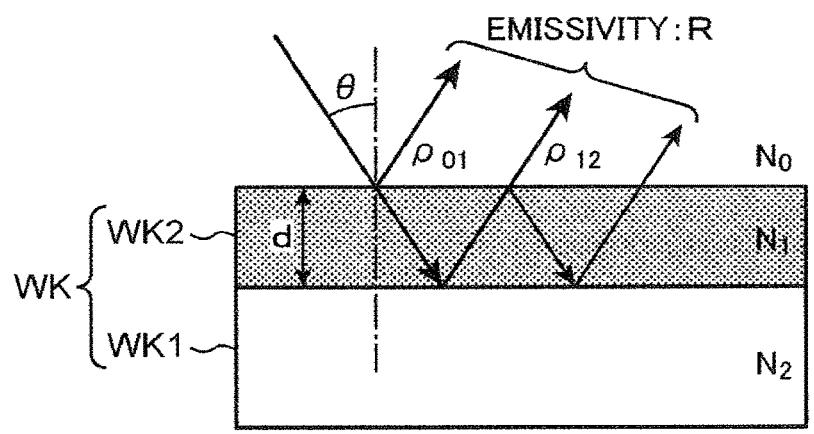
FIG. 5 is a view for explaining a calculation model for calculating a reflectance of a single layer.

FIG. 1 is a block diagram showing a configuration of an oxide layer thickness measurement device according to an embodiment. FIG. 2 is a cross-sectional view explaining an arrangement state of first and second emitting light luminance measurement parts attached to a conveyance passage for a steel sheet in the oxide layer thickness measurement device. FIG. 3 is a graph for explaining a plurality of sets of layer thickness conversion information stored in the oxide layer thickness measurement device. In FIG. 3, the symbol "♦" denotes the information at a first measurement wavelength of 5 μm, and the symbol "■" denotes the information at a second measurement wavelength of 14 μm. FIG. 4 includes graphs each showing a correlation between a thickness of an oxide layer and an emissivity (emitting light luminance) at different measurement wavelengths. FIG. 4A shows that the wavelengths are relatively long. FIG. 4B shows that the wavelengths are relatively short. In FIG. 4A, the symbol "♦" denotes the correlation at a measurement wavelength of 20 μm, and the symbol "▲" denotes the correlation at a measurement wavelength of 14 μm. In FIG. 4B, the symbol "♦" denotes the correlation at a measurement wavelength 5 μm and the symbol "▲" denotes the correlation at a measurement wavelength of 3 μm. In each of FIGS. 3, 4A, and 4B, the horizontal axis indicates the thickness of the oxide layer (oxide layer thickness), and the vertical axis indicates the emissivity (emitting light luminance). FIG. 5 is a view for explaining a calculation model for calculating a reflectance of a single layer.

As shown in FIGS. 1 and 2, an oxide layer thickness measurement device D according to an embodiment includes, for example, a plurality of emitting light luminance measurement parts 1 (1-1, 1-2), a control processing section 2, a storage section 3, an input part 4, an output part 5, and an interface part (IF part) 6, and is disposed in a conveyance passage forming member HS which forms a conveyance passage for conveying a steel sheet WK.

As shown in FIG. 2, the conveyance passage forming member HS is, for example, a relatively long and hollow prismatic member having a rectangular cross-sectional shape with an inner part covered with a heat insulator such as a refractory and forming the conveyance passage for conveying the steel sheet WK. For instance, the conveyance passage forming member HS has one end connected to a downstream end of a direct heating furnace for heating the steel sheet WK running during the conveyance by a direct heating burner to allow an oxide layer having a predetermined thickness to come into existence on a surface of the steel sheet WK, and the other end connected to an upstream end of a reduction device for reducing the oxide layer having come into existence on the surface of the steel sheet WK. The steel sheet WK having been heated in the direct heating furnace emits light while running in the conveyance passage forming member HS. A measurement window forming member unit (observation pipe member unit) HSa is connected to the conveyance passage forming member HS so that the emitting light luminance measurement parts 1 measure emitting light luminances of the steel sheet WK. The measurement window forming member unit HSa includes a first emitting light shield member HSa1 having a cylindrical shape and extending from one sidewall of the conveyance passage forming member HS in a normal direction of the surface of the steel sheet WK, and a second emitting light shield member HSa2 having a cylindrical shape and being shorter than the first emitting light shield member HSa1 with a diameter larger than that of the first emitting light shield member HSa1. The first emitting light shield member HSa1 has one end facing an outside of the conveyance passage forming member HS, and the emitting light luminance measurement parts 1 are attached to the one end for measuring the emitting light luminances of the steel sheet WK. The first emitting light shield member HSa1 has the other end facing an inside of the conveyance passage forming member HS. The second emitting light shield member HSa2 has one end to which the other end of the first emitting light shield member HSa1 is connected airtightly in such a way as to be coaxial with the second emitting light shield member HSa2. The second emitting light shield member HSa2 has the other end facing the surface of the steel sheet WK. An unillustrated window member made of, for example, diamond and allowing for at least light transmittance therethrough at a predetermined measurement wavelength fits in the measurement window forming member unit HSa at a position between the other end of the second emitting light shield member HSa2 and the one end of the first emitting light shield member HSa1 to which the emitting light luminance measurement parts 1 are attached.

The emitting light luminance measurement parts 1 are connected to the control processing section 2 for measuring emitting light luminances of the surface of the steel sheet WK in accordance with a control of the control processing section 2. Measurement wavelengths λ are set differently from each other for the emitting light luminance measurement parts 1. In the embodiment, the emitting light luminance measurement parts 1 include two emitting light luminance measurement parts, i.e., a first emitting light luminance measurement part 1-1 and a second emitting light luminance measurement part 1-2. The first emitting light luminance measurement part 1-1 measures an emitting light luminance of the surface of the steel sheet at a first measurement wavelength $\lambda 1$, and the second emitting light luminance measurement part 1-2 measures an emitting light luminance of the surface of the steel sheet at a second measurement wavelength $\lambda 2$ that is different from the first measurement wavelength $\lambda 1$.

For instance, each of the first and the second emitting light luminance measurement parts 1-1, 1-2 includes: an optical band-pass filter allowing for light transmittance therethrough in a predetermined wavelength band for defining a measurement wavelength $\lambda$; a light receiving element for detecting a light intensity on the surface of the steel sheet WK via the optical band-pass filter; a storage for storing a correlation between an output level of the light receiving element and the emitting light luminance in advance; and an information arithmetic processor for obtaining, based on the output level of the light receiving element obtained by detecting the light intensity on the surface of the steel sheet WK via the optical band-pass filter, the emitting light luminance by using the correlation. A wavelength band (a first wavelength band) for the optical band-pass filter (a first optical band-pass filter) in the first emitting light luminance measurement part 1-1 is set to include the first measurement wavelength $\lambda L$. A wavelength band (a second wavelength band) for the optical band-pass filter (a second band-pass filter) in the second luminance measurement part 1-2 is set to include the second measurement wavelength $\lambda 2$. The storage section 3 and the control processing section 2 may respectively serve as the storage and the information arithmetic processor. Alternatively, an emitting light thermometer may be adopted for each of the first and the second emitting light luminance measurement parts 1-1, 1-2. A commercially available emitting light thermometer typically incorporates an optical band-pass filter with a limited measurement wavelength. The emitting light luminance is measurable from a temperature (display temperature when a set emissivity is defined as "1") and the measurement wavelength in accordance with the Plank's law. Hence, for example, each of the first and the second emitting light luminance measurement parts 1-1, 1-2 includes an emitting light thermometer for measuring a temperature of the surface of the steel sheet WK, and an information arithmetic processor for obtaining an emitting light luminance based on the temperature measured by the emitting light thermometer and the measurement wavelength of the emitting light thermometer. A measurement wavelength for the emitting light thermometer (a first emitting light thermometer) adoptable in the first emitting light luminance measurement part 1-1 is set to the first measurement wavelength $\lambda 1$, and a measurement wavelength for the emitting light thermometer (a second emitting light thermometer) adoptable in the second emitting light luminance measurement part 2-2 is set to the second measurement wavelength $\lambda 2$. Here, the control processing section 2 may serve as the information arithmetic processor. Use of the emitting light thermometer in this manner succeeds in a cost reduction compared with use of a spectro-luminometer. The emitting light thermometer may include, for example, a thermopile, a bolometer, and a pyroelectric sensor.

Hereinafter, the first and the second wavelengths $\lambda 1$, $\lambda 2$ will be described.

An emissivity $\varepsilon$ has a profile that the emissivity $\varepsilon$ monotonically increases until a peak in accordance with an increase in a thickness (oxide layer thickness) d of the oxide layer, and thereafter decreases or repetitively increases and decreases as oxidation progresses in a heating step of a direct heating furnace. A fluctuation in the emissivity a is thought to be caused by an interference between a light emittance of the surface of the oxide layer and a light emittance of an interface between the oxide layer and the metal layer (Kazuo HIRAMOTO, "The Behavior of Spectral Emissivity of Metal in Oxidation Process", iron and steel No. 12, vol. 85, pp. 863-869 (1999)). From this perspective, as shown in FIG. 5, when a single oxide layer WK2 comes into existence on the surface of the steel sheet WK, a reflectance R is, for example, expressed by the following Formula 1, and the emissivity $\varepsilon$ is expressed by the following Formula 3:

$$R=(\rho_{01}+\rho_{12}e^{-2i\delta})/(1+\rho_{01}\rho_{12}e^{-2i\delta});\quad\text{Formula 1:}$$

$$\delta=(2N_1 d\cos\theta)/X;\text{ and}\quad\text{Formula 2:}$$

$$1-R.\quad\text{Formula 3:}$$

Here, the sign "$\theta$" denotes an incident angle. The sign "$\lambda$" denotes a wavelength. The sign "d" denotes a thickness of the oxide layer. The sign "$N_1$" denotes a complex refractive index of the oxide layer WK2. The sign "$\rho_{01}$" denotes a reflectance on an interface between an atmosphere (e.g., air) surrounding the steel sheet WK and the oxide layer WK2. The sign "$\rho_{12}$" denotes a reflectance on an interface between the oxide layer WK2 and a main body WK1 of the steel sheet that is free from oxidation under the oxide layer WK2. The sign "i" denotes an imaginary unit ($i^2=-1$). The sign "e" denotes a Napier's constant ($e\approx 2.71828$). The emitting light luminance depends on the emissivity and the temperature. Here, the temperature of the steel sheet WK is presumed to be constant at a predetermined value. Accordingly, a change in the emissivity shown in each of FIGS. 3 and 4 is readable as a change in the emitting light luminance.

Formulas 1 to 3 are used by defining the wavelength $\lambda$ as a measurement wavelength $\lambda$ to obtain or simulate the correlation between the emissivity $\varepsilon$ and the thickness d of the oxide layer sequentially at different measurement wavelengths $\lambda$. It is seen from FIGS. 4A and 4B that the emissivity $\varepsilon$ at each of the measurement wavelengths $\lambda$ has a profile, as described above, that the emissivity $\varepsilon$ substantially monotonically increases until a peak in accordance with an increase in the thickness d of the oxide layer, and thereafter decreases or repetitively increases and decreases. Besides, an upper limit thickness Th in a range of the thickness d where the emissivity $\varepsilon$ monotonically increases in accordance with the increase in the thickness d of the oxide layer becomes larger at a longer wavelength $\lambda$. For instance, an upper limit thickness Th2 at a measurement wavelength $\lambda$ of around 14 µm such as 4 µm or 20 µm in FIG. 4A is larger than an upper limit thickness Th1 at a measurement wavelength $\lambda$ of around 5 µm such as 3 µm or 5 µm in FIG. 4B. In this respect, the measurement wavelength $\lambda$ is preferably as long as possible only with the aim of the measurement of the thickness d of the oxide layer in a wider range. However, it is seen from FIG. 4 that, in a case of a small layer thickness d, a ratio (slope) of a change in the emissivity $\varepsilon$ to a change in the layer thickness d is small at a long measurement wavelength $\lambda$. Thus, the layer thickness d significantly changes even by a slight difference in the emissivity $\varepsilon$ obtained in the measurement. This results in difficulty in accurately calculating the layer thickness d. Conversely, it is seen from FIG. 4B that, in the case of the small layer thickness d, a ratio (slope) of the change in the emissivity $\varepsilon$ to the change in the layer thickness d is large at a short measurement wavelength $\lambda$. In this case, the layer thickness d can be accurately calculated. From these perspectives of the measurement accuracy, there is a measurement wavelength $\lambda$ suitable for a specific thickness d of the oxide layer. Here, a plurality of layer thickness measurement sub-ranges constituting a predetermined layer thickness measurement range is provided. In view of the measurement accuracy, a wavelength satisfying a correlation between an emissivity (emitting light luminance) and a layer thickness may be selected, for each of the layer thickness measurement sub-ranges, as a measurement wavelength so that a ratio (slope of the emissivity or the emitting light luminance to the layer thickness) of a change in the emissivity (emitting light luminance) to a change in the layer thickness in the layer thickness measurement sub-range falls within a preset extent while the emissivity (emitting light luminance) monotonically increases in accordance with an increase in the thickness of the oxide layer (the emissivity or emitting light luminance corresponds to the layer thickness). The preset extent is, for example, 1 or more to ensure a sufficient examination accuracy of the layer thickness. The preset extent is preferably 1 to keep a good balance between a resolution performance to the layer thickness and a specific layer thickness measurement range (layer thickness measurement sub-range) in consideration of a possibility that the layer thickness measurement range (layer thickness measurement sub-range) is decreased as the ratio (slope) of the change in the emissivity (emitting light luminance) to the change in the layer thickness is increased regardless of improvement in the resolution performance to the layer thickness. Under this knowledge, in the embodiment, the first measurement wavelength $\lambda 1$ is preferably set to around 5 µm such as 3 µm or 5 µm, e.g., set to 5 µm, so that a relatively small layer thickness d can be accurately measured. Further, the second measurement wavelength $\lambda 2$ is set to around 14 µm such as 14 µm or 20 µm, e.g., set to 14 µm, which is longer than the first measurement wavelength λ1 so that a relatively large layer thickness d can be accurately measured. The setting of the first and the second measurement wavelengths λ1, λ2 in this manner enables the layer thickness d to be measured in the layer thickness measurement rage from 0 to Th2. The layer thickness measurement range is constituted by a first layer thickness measurement sub-range from 0 to Th1 and a second layer thickness measurement range from Th1 to Th2. Consequently, the layer thickness d is accurately measurable in each of the first and the second layer thickness measurement sub-ranges.

The input part 4 is connected to the control processing section 2 for receiving inputs of various commands including, for example, a command of instructing a start of a measurement of the thickness of the oxide layer, and various data required for measuring the thickness of the oxide layer, e.g., the name of the steel sheet WK and layer thickness conversion information to be described later, into the oxide layer thickness measurement device D. For instance, the input part 4 may include a plurality of input switches each having a predetermined function, a keyboard, or a mouse. The output part 5 is connected to the control processing section 2 for outputting the commands and the data input via the input part 4 in accordance with a control of the control processing section 2, and a result of the measurement obtained by the oxide layer thickness measurement device D. The output part 5 may be, for example, a display device such as an CRT display, a liquid crystal display (LCD), and an organic EL display, or a printing device such as a printer.

The IF part 6 is a circuit connected to the control processing section 2 for an input and an output of the data between the IF part 6 and an external device in accordance with a control of the control processing section 2. For instance, the IF part 6 may be an interface circuit in the form of RS-232C of a serial communication type, an interface circuit using the Bluetooth (registered trademark) standard, an interface circuit using the Infrared Data Association (IrDA) standard based on an infrared communication, or an interface circuit using the Universal Serial Bus (USB) standard. The IF part 6 may be a circuit for communicating with the external device, e.g., a communication interface circuit adopting a data communication card or IEE802.11 standard.

The storage section 3 is a circuit connected to the control processing section 2 for storing various predetermined programs and various predetermined data in accordance with a control of the control processing section 2. The various predetermined programs include, for example, the following control processing programs: a control program for controlling each of the parts and the sections 1 (1-1, 1-2), and 3 to 6 of the oxide layer thickness measurement device D; and a layer thickness arithmetic processing program for calculating, based on each of the emitting light luminances of the surface of the steel sheet measured by the emitting light luminance measurement parts 1, i.e., the first and the second emitting light luminance measurement parts 1-1, 1-2 in the embodiment, a thickness d of the oxide layer having come into existence on the surface of the steel sheet by using a plurality of sets of layer thickness conversion information stored in a layer thickness conversion information storage part 31 to be described later. The various predetermined data includes data required for executing the programs, e.g., the name of the steel sheet WK and the layer thickness conversion information. The storage section 3 includes, for example, a read only memory (ROM) that is a non-volatile storage element and an electrically erasable programmable read only memory (EEPROM) that is a rewritable and non-volatile storage element. The storage section 3 further includes a random-access memory (RAM) serving as a working memory of the control processing section 2 for storing the data obtained during the execution of each of the predetermined programs. Additionally, the storage section 3 operably includes the layer thickness conversion information storage part 31 for storing the sets of layer thickness conversion information.

The layer thickness conversion information storage part 31 stores the plurality of sets of layer thickness conversion information. Each of the sets of layer thickness conversion information represents a correlation between an emitting light luminance of the surface of the steel sheet and a thickness d of the oxide layer. The sets of layer thickness conversion information respectively correspond to the measurement wavelengths λ of the emitting light luminance measurement parts 1. The sets of layer thickness conversion information are prepared in advance in a state where the sets of layer thickness conversion information respectively correspond to a plurality of layer thickness measurement sub-ranges constituting a predetermined layer thickness measurement range. For example, the sets of layer thickness conversion information are respectively obtained from a plurality of samples in advance. Alternatively, the sets of layer thickness conversion information are obtainable, for example, by simulation using Formulas 1 to 3. Further, each of the sets of layer thickness conversion information allows, in a specific layer thickness measurement sub range corresponding to the thickness conversion information, a ratio of a change in the emitting light luminance to a change in the layer thickness in the layer thickness conversion information to fall within a preset extent assigned for the layer thickness conversion information. As shown in the example in FIG. 3, the layer thickness conversion information storage part 31 in the embodiment stores first layer thickness conversion information α-1 in relation to the first measurement wavelength of 5 μm and second layer thickness conversion information α-2 in relation to the second measurement wavelength of 14 μm. The first layer thickness conversion information α-1 is associated with the first layer thickness measurement sub-range from 0 to Th1 of the layer thickness measurement range from 0 to Th2, and the second layer thickness conversion information α-2 is associated with the second layer thickness measurement sub-range from Th1 to Th2 of the layer thickness measurement range from 0 to Th2. As shown in FIG. 3, the first layer thickness conversion information α-1 has information of an emissivity (emitting light luminance) corresponding to other layer thickness d in addition to that in the first layer thickness measurement sub-range. In this case, a ratio (a slope of the emissivity or the emitting light luminance to the other layer thickness) of a change in the emissivity (emitting light luminance) to a change in the other layer thickness in the first layer thickness measurement sub-range falls within an extent from β11 to β12. As shown in FIG. 3, the second layer thickness conversion information α-2 also has information of an emissivity (emitting light luminance) corresponding to other layer thickness d in addition to that in the second layer thickness measurement sub-range. In this case, a ratio (a slope of the emissivity or the emitting light luminance to the other layer thickness) of a change in the emissivity (emitting light luminance) to a change in the other layer thickness in the second layer thickness measurement sub-range falls within an extent from β21 to β22. The layer thickness conversion information storage part 31 stores in advance each of the sets of layer thickness conversion information, i.e., the first and the second conversion information α-1, α-2 in the embodiment, in the form of, for example, a lookup table or a function expression.

The control processing section 2 controls each of the parts and the sections 1 (1-1, 1-2), 3 to 6 in accordance with an operability of each of these parts and sections. The control processing section 2 is a circuit for calculating, based on each of the emitting light luminances of the surface of the steel sheet measured by the emitting light luminance measurement parts 1, the thickness d of the oxide layer by using the sets of layer thickness conversion information stored in the layer thickness conversion information storage part 31. In the embodiment, the control processing section 2 causes the first emitting light luminance measurement part 1-1 to measure a first emitting light luminance and causes the second emitting light luminance measurement part 1-2 to measure a second emitting light luminance, thereby calculating the thickness d of the oxide layer based on the first and the second layer thickness conversion information stored in the layer thickness conversion information storage part 31. The control processing section 2 may be configured to include, for example, a central processing unit (CPU) and a peripheral circuit therearound. The control processing section 2 further operably establishes a controller 21 and a layer thickness arithmetic processor 22 by executing a corresponding control processing program.

The controller 21 controls each of the parts and the sections 1 (1-1, 1-2), 3 to 6 of the oxide layer thickness measurement device D in accordance with the operability of each of these parts and sections, and controls the entirety of the oxide layer thickness measurement device D.

The layer thickness arithmetic processor 22 calculates, based on each of the emitting light luminances of the surface of the steel sheet measured by the emitting light luminance measurement parts 1, the thickness d of the oxide layer by using the sets of layer thickness conversion information stored in the layer thickness conversion information storage part 31. Specifically, the layer thickness arithmetic processor 22 calculates, in connection with each of the emitting light luminances of the surface of the steel sheet measured by the emitting light luminance measurement parts 1, the thickness d of the oxide layer corresponding to the emitting light luminance of the surface of the steel sheet measured by the corresponding emitting light luminance measurement part 1 and a ratio of a change in the emitting light luminance to a change in the thickness d of the oxide layer by using the layer thickness conversion information corresponding to the measurement wavelength λ of the emitting light luminance measurement part 1, and extracts the calculated thickness d of the oxide layer as a candidate value d for an actual layer thickness when the calculated ratio is within a preset extent assigned for the layer thickness conversion information. In the embodiment, the layer thickness arithmetic processor 22 calculates, in connection with the emitting light luminance of the surface of the steel sheet measured by the first emitting light luminance measurement part 1-1, a thickness d1 of the oxide layer corresponding to the emitting light luminance of the surface of the steel sheet measured by the first emitting light measurement part 1-1 and a ratio RT1 of a change in the emitting light luminance to a change in the thickness d1 of the oxide layer by using the first layer thickness conversion information α-1 corresponding to the first measurement wavelength λ1 (=5 μm) of the first emitting light luminance measurement part 1-1, and extracts the calculated thickness d1 of the oxide layer as a candidate value d for the actual layer thickness when the calculated ratio RT1 is within a set extent from β11 to β12 ($\beta 11 \leq RT1 \leq \beta 12$) assigned for the layer thickness conversion information. The layer thickness arithmetic processor 22 further calculates, in connection with the emitting light luminance of the surface of the steel sheet measured by the second emitting light luminance measurement part 1-2, a thickness d2 of the oxide layer corresponding to the emitting light luminance of the surface of the steel sheet measured by the second emitting light luminance measurement part 1-2 and a ratio RT2 of a change in the emitting light luminance to a change in the thickness d2 of the oxide layer by using the second layer thickness conversion information α-2 corresponding to the second measurement wavelength λ2 (=14 μm) of the second emitting light luminance measurement part 1-2, and extracts the calculated thickness d2 of the oxide layer as a candidate value d for the actual layer thickness when the calculated ratio RT2 is within a set extent from β21 to β22 ($\beta 21 \leq RT2 \leq \beta 22$). For instance, a ratio RT of a change in an emitting light luminance to a change in a layer thickness d is calculated as a derivative value of layer thickness conversion information α at the calculated layer thickness d. Alternatively, for example, a layer thickness ds corresponding to an emitting light luminance that is slightly different from the measured emitting light luminance by a predetermined value Δ is calculated by using specific layer thickness conversion information. Further, a ratio RT ($RT=\Delta/(ds-d)$) of a change ($=\Delta$) in the emitting light luminance to a change ($=ds-d$) in the layer thickness d is calculated based on the measured emitting light luminance and the layer thickness d corresponding thereto and on the emitting light luminance that is different from the measured emitting light luminance by the predetermined value Δ and the layer thickness ds corresponding thereto.

Each of the control processing section 2, the storage section 3, the input part 4, the output part 5, and the IF part 6 is configurable by a personal computer PC of, for example, a desktop type or a laptop type.

Next, an operation in relation to the first embodiment will be described. FIG. 6 is a flowchart showing an operation of the oxide layer thickness measurement device.

The oxide layer thickness measurement device D having the above-described configuration initializes each of the parts and the sections as needed when its power source is turned on, and then restarts the operations thereof. The control processing section 2 is configured to operably establish each of the controller 21 and the layer thickness arithmetic processor 22 in accordance with an execution of a corresponding control processing program.

For instance, in FIG. 6, upon receipt of an input of an instruction for a start of a measurement via the input part 4, the controller 21 of the control processing section 2 causes the first and the second emitting light luminance measurement parts 1-1, 1-2 to respectively measure emitting light luminances of a surface of a steel sheet WK. Specifically, the first emitting light luminance measurement part 1-1 measures an emitting light luminance of the surface of the steel sheet at a first measurement wavelength λ1, and outputs to the control processing section 2 the measured emitting light luminance as a first emitting light luminance. The second emitting light luminance measurement part 1-2 measures an emitting light luminance of the surface of the steel sheet at a second measurement wavelength λ2, and outputs to the control processing section 2 the measured emitting light luminance as a second measured emitting light luminance (step S11). The steel sheet WK is different from a black body in that an emissivity (emitting light luminance) depends on a wavelength λ. In this respect, the first and the second emitting light luminances do not necessarily match each other.

Subsequently, after the measurement of each of the first and the second emitting light luminances, the layer thickness arithmetic processor 22 of the control processing section 2 calculates a thickness d1 of the oxide layer corresponding to the first emitting light luminance of the surface of the steel sheet measured by the first emitting light luminance measurement part 1-1 and a ratio RT1 of a change in the emitting light luminance to a change in the thickness d1 of the oxide layer by using first layer thickness conversion information α-1 corresponding to the first measurement wavelength λ1 (=5 μm) of the first emitting light luminance measurement part 1-1. The layer thickness arithmetic processor 22 further calculates a thickness d2 of the oxide layer corresponding to the second emitting light luminance of the surface of the steel sheet measured by the second emitting light luminance measurement part 1-2, and a ratio RT2 of a change in the emitting light luminance to a change in the thickness d2 of the oxide layer by using second layer thickness conversion information α-2 corresponding to the second measurement wavelength λ2 (=5 μm) of the second emitting light luminance measurement part 1-2 (step S12).

Then, after the calculation of the thickness d of the oxide layer and the ratio RT at the layer thickness d, the layer thickness arithmetic processor 22 determines whether the ratio RT1 calculated in connection with the first emitting light luminance measurement part 1-1 falls within a set extent from β11 to β12 assigned for the first layer thickness conversion information α-1 corresponding to the first measurement wavelength λ1 of the first emitting light luminance measurement part 1-1, and extracts the thickness d1 of the oxide layer calculated together with the ratio RT1 as a candidate value d for an actual layer thickness when the ratio RT1 is within the set extent from β11 to β12. When the ratio RT1 deviates from the set extent from β11 to β12, the thickness d1 of the oxide layer calculated together with the ratio RT1 is abandoned (deleted). The layer thickness arithmetic processor 22 further determines whether the ratio RT2 calculated in connection with the second emitting light luminance measurement part 1-2 falls within a set extent from β21 to β22 assigned for the second layer thickness conversion information α-2 corresponding to the second measurement wavelength λ2 of the second emitting light luminance measurement part 1-2, and extracts the thickness d2 of the oxide layer calculated together with the ratio RT2 as a candidate value d for the actual layer thickness. When the ratio RT2 deviates from the set extent from β21 to β22, the thickness d2 of the oxide layer calculated together with the ratio RT2 is abandoned (deleted).

Furthermore, after the calculation of the thickness d of the oxide layer resulting from the measurement, the controller 21 of the control processing section 2 causes the output part 5 to output the calculated thickness d of the oxide layer, and finishes the flow. If necessary, the controller 21 of the control processing section 2 may output the calculated thickness d of the oxide layer to the IF part 6.

As described heretofore, according to the oxide layer thickness measurement device D and an oxide layer thickness measurement method for use therein, stored for each of layer thickness measurement sub-ranges is specific layer thickness conversion information which allows a ratio (slope) of a change in an emitting light luminance to a change in a layer thickness in the layer thickness measurement sub-range to fall within a set extent. Therefore, each of the oxide layer thickness measurement device D and the oxide layer thickness measurement method makes it possible to prepare layer thickness conversion information which allows a ratio of a change in an emitting light luminance to a change in a layer thickness to fall within a set extent even in an increased layer thickness measurement range by dividing the layer thickness measurement range into an appropriate number of layer thickness measurement sub-ranges. Moreover, in the oxide layer thickness measurement device D and the oxide layer thickness measurement method, emitting light luminances of a surface of a steel sheet are measured at respective measurement wavelengths λn (n=1, 2 in the embodiment) different from each other. Calculated in connection with each of the luminances of the surface of the steel sheet measured at the measurement wavelengths λn are a thickness dn of the oxide layer corresponding to the emitting light luminance of the surface of the steel sheet measured at the measurement wavelength λn and a ratio RTn of a change in the emitting light luminance to a change in the thickness dn of the oxide layer by using layer thickness conversion information α-n corresponding to the measurement wavelength λn, and the calculated thickness dn of the oxide layer is extracted as a candidate value d for an actual layer thickness when the calculated ratio RTn is within a set extent from βn1 to βn2 assigned for the layer thickness conversion information α-m. In this manner, each of the oxide layer thickness measurement device D and the oxide layer thickness measurement method permits a selection of a specific thickness dn of the oxide layer calculated by using the layer thickness conversion information which allows the ratio RTn of the change in the emitting light luminance to the change in the thickness to fall within the set extent from βn1 to βn2 among thicknesses dn of the oxide layer calculated based on the emitting light luminances of the surface of the steel sheet measured at the respective measurement wavelengths an. A more accurate measurement is thus achieved. Consequently, according to the oxide layer thickness measurement device D and the oxide layer thickness measurement method, it is possible to measure the thickness of the oxide layer more accurately in a wider range.

The oxide layer thickness measurement device D and the oxide layer thickness measurement method can contribute to a cost reduction with a configuration including the first and the second emitting light luminance measurement parts 1-1, 1-2 each provided with a relatively inexpensive emitting light thermometer in place of a relatively expensive spectroluminometer. The first emitting light luminance measurement part 1-1 is configured to include a first emitting light thermometer for a measurement at a first measurement wavelength λ1 of around 5 μm where a ratio of a change in the emitting light luminance to a change in the layer thickness falls within a set extent from β11 to β12 in a relatively small-layer-thickness range. The second emitting light luminance measurement part 1-2 is configured to include a second emitting light thermometer for a measurement at a second measurement wavelength λ2 of around 14 μm where a ratio of the change in the emitting light luminance to the change in the layer thickness falls within a set extent from β21 to β22 in a relatively large-layer-thickness range. According to the oxide layer thickness measurement device D and the oxide layer thickness measurement method with this configuration, it is possible to measure the thickness of the oxide layer more accurately in a wider range.

Various aspects of technologies are disclosed in this specification as described above. Main technologies among them will be summarized below.

An oxide layer thickness measurement device according to one aspect is a device for measuring a thickness of an oxide layer which comes into existence on a surface of a steel sheet. The oxide layer thickness measurement device includes: a layer thickness conversion information storage part for storing a plurality of sets of layer thickness conversion information each representing a correlation between an emitting light luminance of the surface of the steel sheet and the thickness of the oxide layer; a plurality of emitting light luminance measurement parts for measuring emitting light luminances of the surface of the steel sheet at respective measurement wavelengths different from each other; and a layer thickness arithmetic processor for calculating, based on each of the emitting light luminances of the surface of the steel sheet measured by the emitting light luminance measurement parts, the thickness of the oxide layer by using the sets of layer thickness conversion information stored in the layer thickness conversion information storage part. The sets of layer thickness conversion information respectively correspond to the measurement wavelengths, and respectively correspond to a plurality of layer thickness measurement sub-ranges constituting a predetermined layer thickness measurement range. In a specific layer thickness measurement sub-range corresponding to specific layer thickness conversion information, a ratio of a change in the emitting light luminance to a change in the layer thickness in the specific layer thickness conversion information falls within a preset extent assigned for the specific layer thickness conversion information. The layer thickness arithmetic processor calculates, in connection with each of the emitting light luminances of the surface of the steel sheet measured by the emitting light luminance measurement parts, the thickness of the oxide layer corresponding to the emitting light luminance of the surface of the steel sheet measured by the corresponding emitting light luminance measurement part and a ratio of a change in the emitting light luminance to a change in the thickness of the oxide layer by using the layer thickness conversion information corresponding to the measurement wavelength of the emitting light luminance measurement part, and extracts the calculated thickness of the oxide layer as a candidate value for an actual layer thickness when the calculated ratio is within the preset extent assigned for the layer thickness conversion information.

The oxide layer thickness measurement device stores, for each of the layer thickness measurement sub-ranges, the specific layer thickness conversion information which allows the ratio (slope) of the change in the emitting light luminance to the change in the layer thickness in the layer thickness measurement sub-range to fall within the set extent. Therefore, the oxide layer thickness measurement device can prepare layer thickness conversion information which allows a ratio of a change in an emitting light luminance to a change in a layer thickness to fall within a set extent even in an increased layer thickness measurement range by dividing the layer thickness measurement range into an appropriate number of layer thickness measurement sub-ranges. The oxide layer thickness measurement device further measures the emitting light luminances of the surface of the steel sheet at the respective measurement wavelengths different from each other. Calculated in connection with each of the emitting light luminances of the surface of the steel sheet measured at the measurement wavelengths are a thickness of the oxide layer corresponding to the emitting light luminance of the surface of the steel sheet measured at the measurement wavelength and a ratio of a change in the emitting light luminance to a change in the thickness of the oxide layer by using the layer thickness conversion information corresponding to the measurement wavelength, and the calculated thickness of the oxide layer is extracted as a candidate value for an actual layer thickness when the calculated ratio is within the preset extent assigned for the layer thickness conversion information. In this manner, the oxide layer thickness measurement device permits a selection of a specific thickness of the oxide layer calculated by using the layer thickness conversion information which allows the ratio of the change in the emitting light luminance to the change in the thickness to fall within the set extent among thicknesses of the oxide layer, calculated based on the emitting light luminances of the surface of the steel sheet measured at the respective measurement wavelengths. A more accurate measurement is thus achieved. Consequently, according to the oxide layer thickness measurement device, it is possible to measure the thickness of the oxide layer more accurately in a wider range.

The plurality of emitting light luminance measurement parts in the oxide layer thickness measurement device preferably includes two emitting light luminance measurement parts, i.e., first and second emitting light measurement parts. The first emitting light measurement part is configured to include a first emitting light thermometer for a measurement at a first measurement wavelength of around 5 µm. The second emitting light measurement part is configured to include a second emitting light thermometer for a measurement at a second measurement wavelength of around 14 µm.

The oxide layer thickness measurement device including the emitting light luminance measurement parts each provided with, in place of a relatively expensive spectroluminometer, the emitting light thermometer exclusive of any beam splitter such as a half mirror can contribute to a cost reduction. The first emitting light luminance measurement part is provided with the first emitting light thermometer for the measurement at the first measurement wavelength of around 5 µm where the ratio of the change in the emitting light luminance to the change in the layer thickness falls within a set extent in a relatively small-layer-thickness range. The second emitting light luminance measurement part is provided with the second emitting light thermometer for the measurement at the second measurement wavelength of around 14 µm where the ratio of the change in the emitting light luminance to the change in the layer thickness falls within the set extent in a relatively large-layer-thickness range. The oxide layer thickness measurement device with this configuration makes it possible to measure the thickness of the oxide layer more accurately in a wider range.

An oxide layer thickness measurement method according to another aspect is a method for measuring a thickness of an oxide layer which comes into existence on a surface of a steel sheet. The oxide layer thickness measurement includes: a plurality of emitting light luminance measurement steps of measuring emitting light luminances of the surface of the steel sheet at respective measurement wavelengths different from each other, and a layer thickness arithmetic processing step of calculating, based on each of the emitting light luminances of the surface of the steel sheet measured in the emitting light luminance measurement steps, the thickness of the oxide layer by using a plurality of sets of layer thickness conversion information each representing a correlation between the emitting light luminance of the surface of the steel sheet and the thickness of the oxide layer. The sets of layer thickness conversion information respectively correspond to the measurement wavelengths, and respectively correspond to a plurality of layer thickness measurement sub-ranges constituting a predetermined layer thickness measurement range. In a specific layer thickness measurement sub-range corresponding to specific layer thickness conversion information, a ratio of a change in the emitting light luminance to a change in the thickness of the oxide layer in the specific layer thickness conversion information falls within a preset extent assigned for the specific layer thickness conversion information. The layer thickness arithmetic processing step includes calculating, in connection with each of the emitting light luminances of the surface of the steel sheet measured in the emitting light luminance measurement steps, the thickness of the oxide layer corresponding to the emitting light luminance of the surface of the steel sheet measured in the corresponding emitting light luminance measurement step and a ratio of a change in the emitting light luminance to a change in the thickness of the oxide layer, and extracting the calculated thickness of the oxide layer as a candidate value for an actual layer thickness when the calculated ratio is within the preset extent assigned for the layer thickness conversion information.

The oxide layer thickness measurement method further storing, for each of the layer thickness measurement sub-ranges, the layer thickness conversion information which allows the ratio (slope) of the change in the emitting light luminance to the change in the layer thickness in the layer thickness measurement sub-range to fall within the set extent. Therefore, the oxide layer thickness measurement method makes it possible to prepare layer thickness conversion information which allows a ratio of a change in an emitting light luminance to a change in a layer thickness to fall within a set extent even in an increased layer thickness measurement range by dividing the layer thickness measurement range into an appropriate number of layer thickness measurement sub-ranges. The oxide layer thickness measurement method further includes: measuring the emitting light luminances of the surface of the steel sheet at the respective measurement wavelengths different from each other; calculating, in connection with each of the emitting light luminances of the surface of the steel sheet measured at the wavelengths, a thickness of the oxide layer corresponding to the emitting light luminance measured at the measurement wavelength and a ratio of a change in the emitting light luminance to a change in the thickness of the oxide layer by using the layer thickness conversion information corresponding to the measurement wavelength; and extracting the calculated thickness of the oxide layer as a candidate value for an actual layer thickness when the calculated ratio is within the preset extent assigned for the layer thickness conversion information. In this manner, the oxide layer thickness measurement method permits a selection of a specific thickness of the oxide layer calculated by using the layer thickness conversion information which allows the ratio of the change in the emitting light luminance to the change in the thickness to fall within the set extent among thicknesses of the oxide layer calculated based on the emitting light luminances of the surface of the steel sheet measured at the respective measurement wavelengths. A more accurate measurement is thus achieved. Consequently, according to the oxide layer thickness measurement method, it is possible to measure the thickness of the oxide layer more accurately in a wider range.

This application is based on Japanese Patent Application No. 2018-211333 filed in Japan Patent Office on Nov. 9, 2018, the entire disclosure of which are hereby incorporated by reference.

Although the present invention has been fully described by way of example with reference to the accompanying drawings, it is to be understood that various changes and/or modifications will be apparent to those skilled in the art. Therefore, unless otherwise such changes and modifications to be made by those skilled in the art depart from the scope of the present invention hereinafter defined, they should be construed as being included therein.

INDUSTRIAL APPLICABILITY

The present invention can provide an oxide layer thickness measurement device and an oxide layer thickness measurement method for measuring a thickness of an oxide layer which comes into existence on a surface of a steel sheet.

The invention claimed is:

1. An oxide layer thickness measurement device for measuring a thickness of an oxide layer which comes into existence on a surface of a steel sheet, comprising:
  a layer thickness conversion information storage part for storing a plurality of sets of layer thickness conversion information each representing a correlation between an emitting light luminance of the surface of the steel sheet and the thickness of the oxide layer,
  a plurality of emitting light luminance measurement parts for measuring emitting light luminances of the surface of the steel sheet at respective measurement wavelengths different from each other; and
  a layer thickness arithmetic processor for calculating, based on each of the emitting light luminances of the surface of the steel sheet measured by the emitting light luminance measurement parts, the thickness of the oxide layer by using the sets of layer thickness conversion information stored in the layer thickness conversion information storage part, wherein
  the sets of layer thickness conversion information respectively correspond to the measurement wavelengths, and respectively correspond to a plurality of layer thickness measurement sub-ranges constituting a predetermined layer thickness measurement range,
  in a specific layer thickness measurement sub-range corresponding to specific layer thickness conversion information, a ratio of a change in the emitting light luminance to a change in the layer thickness in the specific layer thickness conversion information falls within a preset extent assigned for the specific layer thickness conversion information, and
  the layer thickness arithmetic processor calculates, in connection with each of the emitting light luminances of the surface of the steel sheet measured by the emitting light luminance measurement parts, the thickness of the oxide layer corresponding to the emitting light luminance of the surface of the steel sheet measured by the corresponding emitting light luminance measurement part and a ratio of a change in the emitting light luminance to a change in the thickness of the oxide layer by using the layer thickness conversion information corresponding to the measurement wavelength of the emitting light luminance measurement part, and extracts the calculated thickness of the oxide layer as a candidate value for an actual layer thickness when the calculated ratio is within the preset extent assigned for the layer thickness conversion information.

2. An oxide layer thickness measurement method for measuring a thickness of an oxide layer which comes into existence on a surface of a steel sheet, comprising:
  a plurality of emitting light luminance measurement steps of measuring emitting light luminances of the surface of the steel sheet at respective measurement wavelengths different from each other; and a layer thickness arithmetic processing step of calculating, based on each of the emitting light luminances of the surface of the steel sheet measured in the emitting light luminance measurement steps, the thickness of the oxide layer by using a plurality of sets of layer thickness conversion information each representing a correlation between the emitting light luminance of the surface of the steel sheet and the thickness of the oxide layer, wherein the sets of layer thickness conversion information respectively correspond to the measurement wavelengths, and respectively correspond to a plurality of layer thickness measurement sub-ranges constituting a predetermined layer thickness measurement range, in a specific layer thickness measurement sub-range corresponding to specific layer thickness conversion information, a ratio of a change in the emitting light luminance to a change in the thickness of the oxide layer in the specific layer thickness conversion information falls within a preset extent assigned for the specific layer thickness conversion information, and the layer thickness arithmetic processing step includes calculating, in connection with each of the emitting light luminances of the surface of the steel sheet measured in the emitting light luminance measurement steps, the thickness of the oxide layer corresponding to the emitting light luminance of the surface of the steel sheet measured in the corresponding emitting light luminance measurement step and a ratio of a change in the emitting light luminance to a change in the thickness of the oxide layer, and extracting the calculated thickness of the oxide layer as a candidate value for an actual layer thickness when the calculated ratio is within the preset extent assigned for the layer thickness conversion information.

* * * * *